(12) United States Patent
Prabhu et al.

(10) Patent No.: US 12,555,091 B2
(45) Date of Patent: Feb. 17, 2026

(54) MICROTRANSACTION SYSTEM

(71) Applicant: Dropp, Inc., Newark, NJ (US)

(72) Inventors: Sushil Prabhu, North Caldwell, NJ (US); Rajiv Sohal, Livingston, NJ (US)

(73) Assignee: Dropp, Inc., Newark, NJ (US)

( * ) Notice: Subject to any disclaimer, the term of this patent is extended or adjusted under 35 U.S.C. 154(b) by 37 days.

(21) Appl. No.: 18/078,160

(22) Filed: Dec. 9, 2022

(65) Prior Publication Data

US 2023/0186273 A1 Jun. 15, 2023

Related U.S. Application Data

(60) Provisional application No. 63/287,715, filed on Dec. 9, 2021.

(51) Int. Cl.
*G06Q 20/22* (2012.01)
*G06Q 20/10* (2012.01)
(Continued)

(52) U.S. Cl.
CPC ........... *G06Q 20/29* (2013.01); *G06Q 20/102* (2013.01); *G06Q 20/3274* (2013.01);
(Continued)

(58) Field of Classification Search
None
See application file for complete search history.

(56) References Cited

U.S. PATENT DOCUMENTS

| RE40,444 E * | 7/2008 | Linehan | G06Q 20/02 |
| | | | 713/172 |
| 8,732,457 B2 * | 5/2014 | Micali | H04L 9/007 |
| | | | 726/20 |

(Continued)

FOREIGN PATENT DOCUMENTS

| WO | WO-2088874 A2 * | 11/2002 |
| WO | WO-2097750 A1 * | 12/2002 |
| WO | WO-3050648 A2 * | 6/2003 |

OTHER PUBLICATIONS

Imran Bashir. "Mastering Blockchain Second Edition Distributed ledger technology, decentralization, and smart contracts explained." (2018). Retrieved online Aug. 8, 2024. https://users.cs.fiu.edu/~prabakar/cen5079/Common/textbooks/Mastering_Blockchain_2nd_Edition.pdf (Year: 2018).*

(Continued)

*Primary Examiner* — James A Reagan
(74) *Attorney, Agent, or Firm* — OSTROLENK FABER LLP

(57) ABSTRACT

A method of effecting a transaction with a micropayment platform that includes a merchant-participant, a consumer-participant, a micropayment system, and a distributed ledger, the method includes receiving by the micropayment system from the merchant-participant a digital promise to pay document (DPP), validating the DPP by the micropayment system, the DPP including at least a payable amount, which includes an amount payable to the merchant-participant; sending a message to the merchant-participant indicating that the amount payable to the merchant-participant is available by checking an account associated with the consumer-participant; creating a transaction file based on the DPP, and recording the transaction file in the distributed ledger by the micropayment system; debiting from the account associated with the consumer-participant an amount corresponding to the amount payable to the merchant-participant; crediting an account of the merchant-participant with an amount indicated to be payable to the merchant-participant.

15 Claims, 11 Drawing Sheets

(51) Int. Cl.
  *G06Q 20/32* (2012.01)
  *G06Q 20/36* (2012.01)
  *G06Q 20/38* (2012.01)
(52) U.S. Cl.
  CPC ..... *G06Q 20/3678* (2013.01); *G06Q 20/3825* (2013.01); *G06Q 20/3829* (2013.01); *G06Q 2220/00* (2013.01)

(56) References Cited

U.S. PATENT DOCUMENTS

| | | | | |
|---|---|---|---|---|
| 10,223,685 | B2* | 3/2019 | Cole | G06Q 20/29 |
| 10,339,523 | B2* | 7/2019 | McDonough | G06Q 20/308 |
| 10,791,354 | B2* | 9/2020 | Frank | H04N 21/234345 |
| 11,238,423 | B2* | 2/2022 | Fang | G06Q 20/145 |
| 11,244,309 | B2* | 2/2022 | Bentov | G06Q 20/389 |
| 11,556,959 | B2* | 1/2023 | Fournier | H04L 9/3247 |
| 11,875,330 | B2* | 1/2024 | Musiala, Jr. | G06Q 20/0655 |
| 2004/0199475 | A1* | 10/2004 | Rivest | G06Q 20/04 705/67 |
| 2015/0278820 | A1* | 10/2015 | Meadows | G10L 25/48 705/64 |
| 2015/0379510 | A1* | 12/2015 | Smith | G06F 21/64 705/71 |
| 2017/0032337 | A1* | 2/2017 | Berger | H04L 67/53 |
| 2017/0083907 | A1* | 3/2017 | McDonough | G06Q 20/3825 |
| 2017/0085545 | A1* | 3/2017 | Lohe | G06Q 20/10 |
| 2017/0085555 | A1* | 3/2017 | Bisikalo | G06Q 20/10 |
| 2017/0232300 | A1* | 8/2017 | Tran | G06F 1/163 434/247 |
| 2017/0249623 | A1* | 8/2017 | Cole | G06Q 20/29 |
| 2018/0216946 | A1* | 8/2018 | Gueye | G01C 21/3617 |
| 2018/0276626 | A1* | 9/2018 | Laiben | G06Q 20/3829 |
| 2018/0285863 | A1* | 10/2018 | Loh | G06Q 20/0655 |
| 2019/0095879 | A1* | 3/2019 | Eyal | G06Q 20/223 |
| 2020/0007918 | A1* | 1/2020 | Frank | H04N 21/44008 |
| 2020/0134595 | A1* | 4/2020 | Musiala, Jr. | G06Q 20/326 |
| 2020/0265395 | A1* | 8/2020 | Fang | G06Q 20/02 |
| 2020/0364187 | A1* | 11/2020 | Tran | G06N 3/02 |
| 2021/0035098 | A1* | 2/2021 | Long | H04L 9/0643 |
| 2021/0295290 | A1* | 9/2021 | Buradagunta | G06Q 20/38215 |
| 2021/0390585 | A1* | 12/2021 | Fournier | H04L 9/3247 |
| 2022/0405752 | A1* | 12/2022 | Davies | G06Q 20/065 |
| 2023/0095123 | A1* | 3/2023 | Fournier | G06F 21/6245 713/176 |

OTHER PUBLICATIONS

Sijia Zhao et al. "Applying Blockchain Layer2 Technology to Mass E-Commerce." (2020). Retrieved online Aug. 8, 2024. https://eprint.iacr.org/2020/502.pdf (Year: 2020).*

Pradip Singh Maharjan et al. "Performance Analysis of Blockchain Platforms Performance Analysis of Blockchain Platforms." (Aug. 2018). Retrieved online Aug. 8, 2024. https://digitalscholarship.unlv.edu/cgi/viewcontent.cgi?article=4370&context=thesesdissertations (Year: 2018).*

* cited by examiner

FIG. 5A

```
{
    "accountId": "0.0.47748450",    ← (18)
    "amount": 0.7036,
    "currency": "USD",
    "payoutType": "MERCHANT",    ← (20)
    "walletId": {
        "userId": "80156be5-a2da-8169-941f-a5f1cd965c44",
        "currencyCode": "USD"
    },
    "exchangeRate": 1
},
{
    "accountId": "0.0.21525b6",
    "amount": 0.037,
    "currency": "USD",
    "payoutType": "MERCHANT",    ← (20)
    "walletId": {
        "userId": "729",
        "currencyCode": "USD"
    },
    "exchangeRate": 1
},
{
    "accountId": "0.0.47753355",
    "amount": 0.7406,
    "currency": "USD",
    "payoutType": "CUSTOMER",    ← (20)
    "walletId": {
        "userId": "f51d9b88-b574-4d5b-99fb-fb79391b78a4",
        "currencyCode": "USD"
    },
    "exchangeRate": 1
}
```

```
{
    "accountId": "0.0.47753355",
    "amount": -2180,
    "currency": "USD",
    "payoutType": "CUSTOMER",    ← (20)
    "walletId": {
        "userId": "f51d9b88-b574-4d5b-99fb-fb79391b78a4",
        "currencyCode": "DCT"
    },
    "exchangeRate": 0.0001
},
{
    "accountId": "0.0.47748450",
    "amount": -2159,
    "currency": "USD",
    "payoutType": "MERCHANT",    ← (20)
    "walletId": {
        "userId": "729",
        "currencyCode": "DCT"
    },
    "exchangeRate": 0.0001
},
{
    "accountId": "0.0.2152566",
    "amount": -21,
    "currency": "USD",
    "payoutType": "MERCHANT",    ← (20)
    "walletId": {
        "userId": "0.0.2152566",
        "currencyCode": "DCT"
    },
    "exchangeRate": 0.0001
}
```

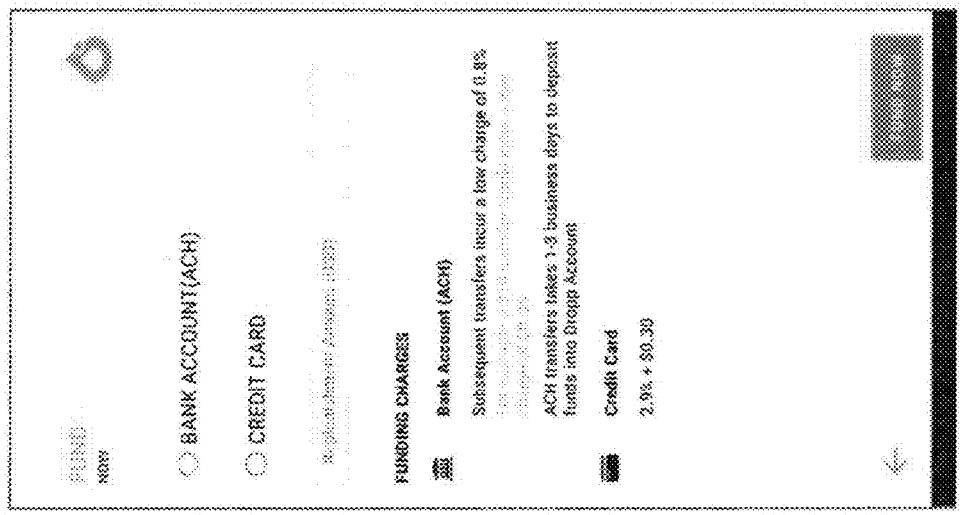

MICROTRANSACTION SYSTEM

CROSS-REFERENCE TO RELATED APPLICATION

The present non-provisional patent application claims the benefit of and priority to U.S. Provisional Patent Application No. 63/287,715, filed Dec. 9, 2021, by Sushil Prabhu and Rajiv Sohal, and entitled "MICROTRANSACTION SYSTEM," the entire contents of which are incorporated herein by reference.

FIELD OF INVENTION

The present invention relates to a micropayment platform and a method of validating a transaction that includes a payment instruction.

BACKGROUND OF THE INVENTION

Commerce Payment systems have several limitations and drawbacks for consumers and merchants particularly for e-commerce. Transaction costs, consumer privacy, trust in third party record keeping, delays in merchants receiving payments, and the limitation of payments to a 1-1, consumer to merchant payment model.

Transaction costs with current consumer payment methods such as credit cards and debit cards include high transaction costs for merchants. Merchants often require minimum amounts for transactions or transactions are aggregated and charged monthly meaning the merchant has a significant delay in receiving payment. Some payment providers allow merchants to receive payments sooner, but at a higher fee to the merchant.

Transacting digitally with merchants requires consumers to share financial details such as card information and personal information to make a purchase. Personal and financial information is the target of many hacks into company commerce databases. Stolen financial information such as card numbers, expiration date, etc. can be used in fraudulent card charges without possessing the physical card. Additionally, personal information from transaction is often used in merchant marketing efforts or sold to third parties. Consequently, many consumers do not want to provide their information to providers of goods and services. The more places they share or save their card information the more likely they will be subject to information theft.

Merchants and consumers must trust third party record keeping systems, which have limited visibility into the transaction data related to them. This is a particular problem when there are business relationships that share revenue, e.g. parties to the product creation, parties with a sales incentive, parties with a distribution/delivery relationship. Payment transactions models do not permit merchants to specify sending portions of the payment to partners, affiliates, etc. who are parties to the delivery of goods and services as part of one transaction. These require making additional transactions without being tied to the original purchase by which they should be paid. This leads to a hub and spoke model that creates payment delays and lack of transparency.

In the area of value transfers, public Distributed Ledger Networks offer a new alternative for transfers of value where each party in the transaction cryptographically signs the record using a private key. Public Distributed Ledgers offer a new level of transactions security and trust since intermediaries are not involved that could potentially tamper with transactions between counterparties. Transactions on a distributed ledger require being signed by an account holder to conduct transactions using a private key. On Public Distributed Ledgers, each ledger entry is inspectable and verifiable. Many also have very low transaction costs for making new ledger entries and making transfers of value. Using low-cost distributed ledgers allows making payments of less than one cent economical. A new level of transparency, trust, and economics is enabled by distributed ledgers.

SUMMARY OF THE INVENTION

A method according to the present invention effects a transaction with a micropayment platform that includes a merchant-participant comprising at least one computer, a consumer-participant comprising at least one computer configured to communicate with the merchant-participant via a communication network, a micropayment system comprising at least one computer configured to communicate with the merchant-participant via the communication network, and a distributed ledger comprising at least one computer configured to communicate with the micropayment system via the communication network, which method includes:

receiving by the micropayment system from the merchant-participant a digital promise to pay document (DPP);

validating the DPP by the micropayment system, the DPP including information from a digital merchant invoice (DMI) from the merchant-participant, an electronic signature of the merchant-participant, an electronic signature of the consumer-participant, and payment instructions that include an instruction to transfer an amount from an account associated with the consumer-participant to at least an account associated with the merchant-participant; and sending a message to the merchant-participant indicating that the amount payable to the merchant-participant is available by checking an account associated with the consumer-participant; and effecting payment according to payment instructions.

The payable amount in the DPP may include an amount payable to another party or other parties, and the method may further include debiting from the account associated with the consumer-participant an amount corresponding to the amount payable to the another party or the other parties; and crediting an account of the another party or the other parties with an amount corresponding to the amount payable to the another party or the other parties based upon the merchant instructions in the DPP. That is, the payment instructions may include at least another instruction to transfer an amount from the account associated with the consumer-participant to an account associated with a third party (or third parties) designated by the merchant-participant, and the method further includes effecting payment to the account associated with the third party designated by the merchant-participant. This particular feature reduces the overall cost and time for processing a transaction in which a single payment needs to be split between multiple parties, and will also add to the transparency of the transactions. For example, in online sales of content, there could be many parties each having a relationship with the merchant for the production, the delivery, or the sale of the product or service sold to a consumer. In such a case, there may be another third party payee or third party payees that the merchant would have to pay from the sale. An example of such a product could be a streaming bundle composed of several different content providers who will have to be paid once the product is sold by the merchant-participant. Another example could be an online transaction involving a sale of a digital product (e.g. a digital image). In this example, the payment from the consumer-participant's account may be split by the micropayment system between the merchant, the creator, and even potentially a referrer, according to the instructions from the merchant, which significantly reduces the overall transaction cost to the merchant. Consequently, the method can allow for profitability of even small on-line sales that involve multiple payments after the sale is made.

The amount payable to the merchant-participant may be in a fiat currency or in a cryptocurrency.

The consumer-participant's signature may be a private key provided by the micropayment system and associated with a public key, and the private key may be associated with the account that is associated with the consumer-participant, and the method may further include using the public key in the checking of the account associated with the consumer-participant.

The merchant-participant's signature may be a private key stored at the merchant-participant.

The merchant-participant may be a website configured for e-commerce or a physical device capable of displaying a QR code generated by the merchant.

The consumer-participant may be a computer having a digital wallet residing thereon that is configured to generate the DPP from the DMI by digitally signing the DPP with a digital signature.

The digital signature may be a private key associated with the account associated with the consumer-participant.

The mobile computer is a smart phone, a tablet, or a PC.

The micropayment system may be configured to create an account in the distributed ledger along with a private key for the account and a public key, and the method may further include, prior to the receiving by the micropayment system from the merchant-participant a digital promise to pay document (DPP), creating, by the micropayment system, an account in the distributed ledger for the consumer-participant along with an associated private key and an associated public key for the created account, wherein the created account is the account associated with the consumer-participant that is checked by micropayment system.

The method may further include crediting, with the micropayment system, the account associated with the consumer-participant with a fiat currency or a cryptocurrency according to instruction received from the consumer-participant.

The payment instructions may include an instruction to make payment with a fiat currency in the account associate with the consumer-participant, and the method may further include,
  submitting a record to the distributed ledger indicating payment from the account associated with the consumer-participant to the account associated with the merchant-participant;
  debiting from the account associated with the consumer-participant an amount corresponding to the amount payable to the merchant-participant in fiat currency; and
  crediting the account associated with the merchant-participant the amount payable to the merchant-participant in fiat currency.

The payment instructions include an instruction to make payment with a crypto-currency in the account associated with the consumer-participant, and the method further includes,
  submitting the signed payment instructions to the distributed ledger to perform the transfer from the account associated with the consumer-participant to the account associated with the merchant-participant.

Other features and advantages of the present invention will become apparent from the following description of the invention which refers to the accompanying drawings.

BRIEF DESCRIPTION OF THE DRAWINGS

FIGS. 5A and 5B illustrate simultaneous payment instruction using multiple currencies.

FIG. 11 is an example of a funding screenshot.

DETAILED DESCRIPTION OF PREFERRED EMBODIMENTS OF THE INVENTION

The present invention is concerned with a micropayment platform that implements a payment over a communication network such as the Internet.

A micropayment platform according to the present invention employs a protocol to validate a digital promise to pay document ("DPP") and to record the validated DPP on a distributed ledger.

A micropayment platform according to the present invention includes a merchant system (for example, a merchant website) configured to generate a DMI, a digital consumer wallet configured to create a DPP from a digital merchant invoice ("DMI"), a micropayment system configured to implement the protocol that validates the DPP, and a distributed ledger.

The terms "wallet", "digital consumer wallet", or "consumer wallet" used herein refer to a computer having a non-transitory digital wallet application residing thereon. The computer may be a smart phone, a tablet, or a PC. A browser-based companion wallet to the mobile wallet (residing, for example, on a PC) may also be used.

The merchant system may be a computer (for example, a server) or a plurality of computers (for example, servers) configured (i.e. programmed) for e-commerce.

The micropayment system is one computer (for example, a server) or a plurality of computers (for example, servers) configured (i.e. programmed) to perform the method described herein.

The distributed ledger may be a computer or a plurality of computers configured to store transaction records electronically in a non-transitory manner. The micropayment system may be in communication with the distributed ledger through a communication network such as the Internet.

The consumer wallet, the merchant system, and the micropayment system are configured to communicate with one another via a communication network, for example, the Internet.

A micropayment platform according to the present invention is a permissioned platform meaning that the consumer wallet and the merchant system must be permitted to participate.

A merchant system that is permitted to participate in a transaction carried out over the platform is hereafter called a merchant-participant.

Similarly, a consumer's device (on which a digital wallet resides), i.e. a consumer wallet, that is permitted to participate in a transaction carried out over the platform is hereafter called a consumer-participant.

Figure 9:
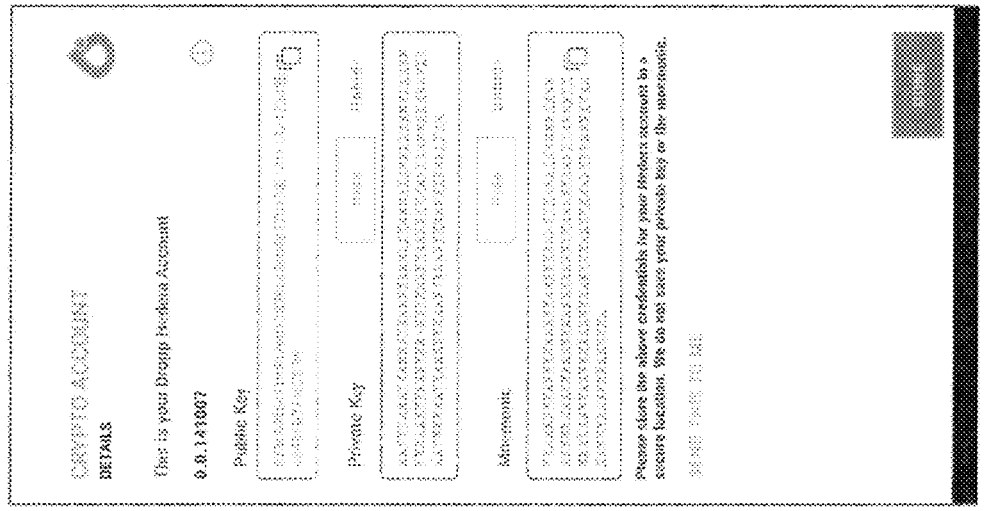
FIG. 9 is an example screenshot showing access to account keys and mnemonic.

To permit a consumer wallet to participate, an installation and setup process may be provided to create an account on a distributed ledger and to create an associated private and public key pair for the consumer wallet on a distributed ledger, or on a plurality of distributed ledgers. The private key(s) and public key(s) are stored on the consumer wallet. A signature is required using a private key to complete payment transactions. Each account has a recovery mnemonic seed phrase as, for example, shown in FIG. 9.

To permit a merchant system to participate, an installation and setup process may be provided as further explained below.

Referring to FIG. 11, a consumer-participant may be used to conduct a transaction (i.e. pay) in a fiat currency from a prepaid account funded by the consumer using a credit/debit card or a bank transfer (ACH) before making payments. The prepaid account may be hosted by the micropayment system.

Figure 10:
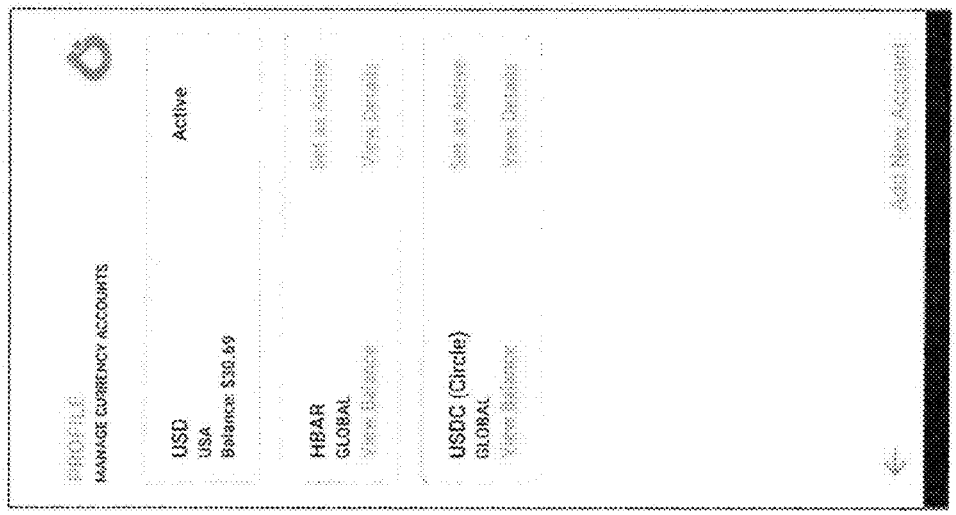
FIG. 10 is an example balances screenshot that allows selection of a default payment currency.

Referring to FIG. 10, alternatively, the consumer-participant may conduct a transaction (i.e. pay) in a cryptocurrency supported by the micropayment platform and acceptable by the merchant.

In a method according to the present invention, payment processing is based on a DPP (containing the merchant's invoice and payment transfer instructions), which is digitally confirmed with a digital signature by the merchant and digitally confirmed with a digital signature by the consumer as further explained below.

To generate the DPP, the consumer-participant is configured to create and digitally confirm a DMI received from a merchant-participant.

According to one aspect of the present invention, the DPP does not include any of the consumer's personal or financial information. Consequently, no information about the consumer's financial account(s) or consumer's personal information is shared with the merchant-participant.

The merchant-participant has an account (or accounts) and a private key (or private keys) stored therein for the distributed ledger(s) based on the form of payment the merchant accepts. A merchant-participant can accept payment in fiat currencies and/or in a cryptocurrency that the micropayment platform supports, and the merchant-participant accepts as payment. The merchant private key(s) are used to confirm the DPP that will be recorded on a distributed ledger or distributed ledgers.

The micropayment system guarantees that: 1) the DPP is well formed, 2) complies with the details of the DMI, and 3) the digital signatures of both parties are valid.

The micropayment system also confirms that the account associated with the consumer-participant has the funds in fiat or cryptocurrency to pay for the good(s) or service(s) listed in the DMI (whether the payment is in a fiat currency or in cryptocurrency), and will inform the merchant-participant that there are sufficient funds being transferred to the merchant-participant's account before the good(s) or service(s) listed in the DMI are sent to the consumer.

When a fiat currency is designated as the payment method, the micropayment system records the validated DPP on a distributed ledger or a plurality of distributed ledgers. The micropayment system will also record changes in the balance of the consumer-participant's fiat currency account, both funding (credit) and payment (debit) on a distributed ledger.

When a cryptocurrency is designated as the payment method, the micropayment system records a distributed ledger transaction indicating the transfer of the cryptocurrency amount specified in the DPP from the consumer-participant's cryptocurrency account to the merchant-participant's cryptocurrency account.

With both fiat currency and cryptocurrency payments, multiple parties can receive payments which are made available immediately.

In order to become participants in the micropayment platform, each prospective participating consumer wallet and each prospective participating merchant system must be registered with the micropayment system.

A consumer wishing to configure a digital wallet to participate in the micropayment platform, must first setup a distributed ledger account. To do so, the consumer must validate consumer's e-mail address and phone. For example, the micropayment system may send the consumer an email with a link generated by the micropayment system that is unique to the consumer. Clicking on the link may validate the email address as the consumer's e-mail address at the micropayment system. The micropayment system may also send a one-time passcode to the device (e.g. smart phone) the consumer intends to configure to have a wallet application associated with a distributed ledger account. In the setup of the wallet, a new account on the distributed ledger is created using a seed phrase to generate a private key for the account and a public key to validate signatures. A mnemonic seed phrase is used to generate the key pair which is used for the recovery of an account. The private key is unique to the consumer's account that resides on the distributed ledger and is used to digitally sign (confirm) transactions that are recorded on the distributed ledger. Signatures appearing with the recorded distributed ledger transactions are validated by the micropayment system using the public key for the consumer's distributed ledger account.

The consumer provides to the micropayment system a recovery phrase to be able to recover the mnemonic seed phrase used to generate the private key. The micropayment system generates a QR code which is an encrypted form of the mnemonic. To recover the user's private key the user can use the user's wallet to scan the recovery QR code and type in the user's recovery phrase. The micropayment system will decrypt the mnemonic seed phrase to recreate the consumer's private key and restore the consumer's account.

After the consumer sets up the consumer's wallet, the consumer can fund the consumer-participant's account with a fiat currency using a credit/debit card transaction or can transfer money from a bank account to an omnibus account of the micropayment system. The omnibus account holds funds deposited by consumer-participants to make micropayments. A consumer-participant that wants to make payments with a cryptocurrency would make a transfer of the cryptocurrency to the distributed ledger account set up for the consumer-participant.

The following are the steps that may be carried out to configure a mobile computer (i.e. smart phone) to become a consumer-participant.

First, the consumer downloads a micropayment mobile wallet application from the micropayment system or any other online app store to a device (e.g. a smart phone, a tablet, or a PC).

Next, the consumer sends a sign-up request to the micropayment system. The sign-up request will have the consumer's email address and the consumer's mobile phone number. The sign-up request may be sent via any suitable electronic messaging system.

An e-mail is then sent by the micropayment system to the consumer's e-mail address in response the consumer's sign-up request with a link to validate the consumer's e-mail address.

The micropayment system also sends the consumer a one-time pass phrase to enter in the downloaded wallet application to validate the consumer's phone number.

The downloaded mobile wallet then creates a distributed ledger account with an associated private key, and an associated public key for the consumer's account. The keys are saved on the consumer's mobile device. The consumer enters a recovery phrase that can be used for private key recovery. The system emails the consumer a QR code encoded with the consumer's mnemonic seed phrase that is encrypted and can be decrypted using the consumer's recovery (mnemonic seed) phrase.

A consumer can choose to add cryptocurrencies from the list of supported cryptocurrencies.

The consumer can also fund the mobile wallet with a fiat currency by making a request to the micropayment system to create a credit/debit card transaction or bank account transfer (ACH).

In response to the request from the consumer to create a credit/debit card transaction or bank account transfer (e.g. ACH or RTP), the micropayment system credits the consumer's distributed ledger account and creates and records a distributed ledger transaction indicating the amount credited to the consumer's distributed ledger account.

To make payment with a cryptocurrency, the consumer may either make a transfer of cryptocurrency to the consumer's distributed ledger account or provide the consumer's distributed ledger account with its associated private key to the wallet application.

A merchant that wishes to become a participant in the micropayment platform must register with the micropayments system. To do so, the merchant must validate an email address for the purposes of signing up with the micropayment system. A merchant must also provide information about the merchant's company and the merchant's product(s) or service(s) for which the merchant will accept a payment from the micropayment system. Each merchant must be approved before being allowed to become a participant in the micropayment platform. Each merchant that is approved for participation can elect to accept payments in a fiat currency, a cryptocurrency(ies), or both. Each merchant that is approved for participation will have an account on the distributed ledger. Each merchant that is approved for participation will have a public and private key pair to "digitally" sign transactions, and to receive a cryptocurrency payment if the merchant has indicated that cryptocurrency payments are acceptable.

A merchant may setup an account to participate in the micropayment platform in the following manner.

The merchant may start the setup process by providing the merchant's corporate contact, and information about the merchant organization to the micropayment system.

The merchant elects whether to accept fiat currency payments and can choose one cryptocurrency or a plurality of cryptocurrenies for payments.

To accept fiat currency payments, the merchant must provide the merchant's banking information to the micropayment system.

The merchant must provide the merchant's distributed ledger account information to receive payments.

The micropayment system will create a distributed ledger account and generate a public and private key pair for the merchant. The key pair will be used to sign transactions and to validate the merchant's signature on a transaction.

Once the set-up process is complete, the merchant's system will become a merchant-participant in the micropayment platform.

Promise to Pay Protocol in Detail

Once a merchant system has been approved as a participant in the micropayment platform (merchant-participant) and a consumer wallet has become a participant in the micropayment platform (consumer-participant), the micropayment system may carry out a transaction between the merchant-participant and the consumer-participant based on a promise to pay protocol using a fiat currency (FIG. 1) as payment, or a cryptocurrency (FIG. 2) as payment.

Figure 1:
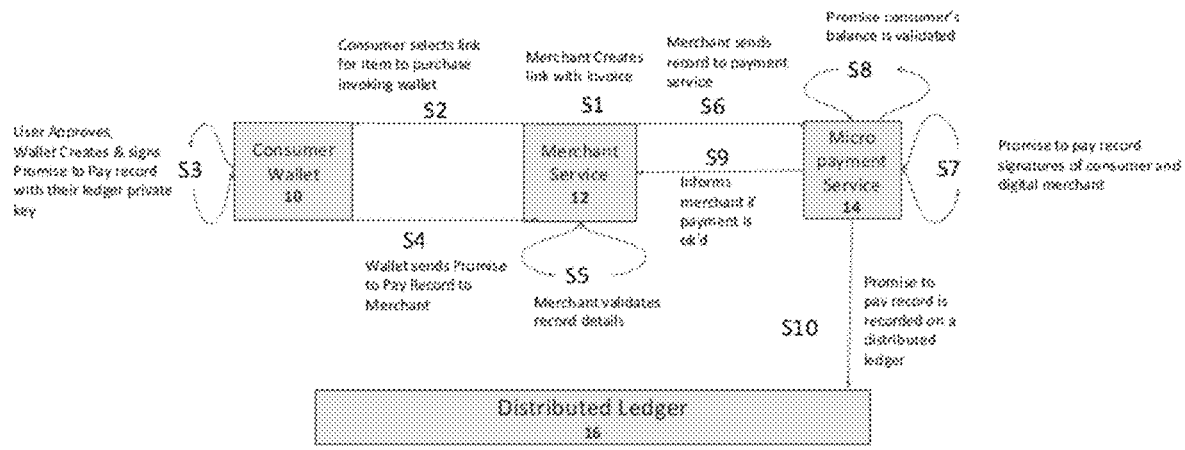
FIG. 1 illustrates a micropayment transaction using a micropayment platform with a fiat currency as payment.

Referring to FIG. 1, in response to a request from a consumer-participant 10 for good(s) or service(s) ("item") offered for sale by the merchant-participant 12, the merchant-participant 12 creates a DMI (S1). The DMI may include the description of the item, the cost of the item in fiat currency, and payment distribution instructions. The payment distribution instructions may include instructions to fund multiple accounts. The merchant-participant 12 then sends the DMI (S2) (in a text message or email, for example) to the consumer-participant 10 along with a clickable link. As an alternative, a QR code may be generated by the merchant-participant 12 and sent to the consumer-participant 10 along with the DMI.

Figure 6:
FIG. 6 is an example screenshot of a merchant web site.
Figure 6:
Figure 7:
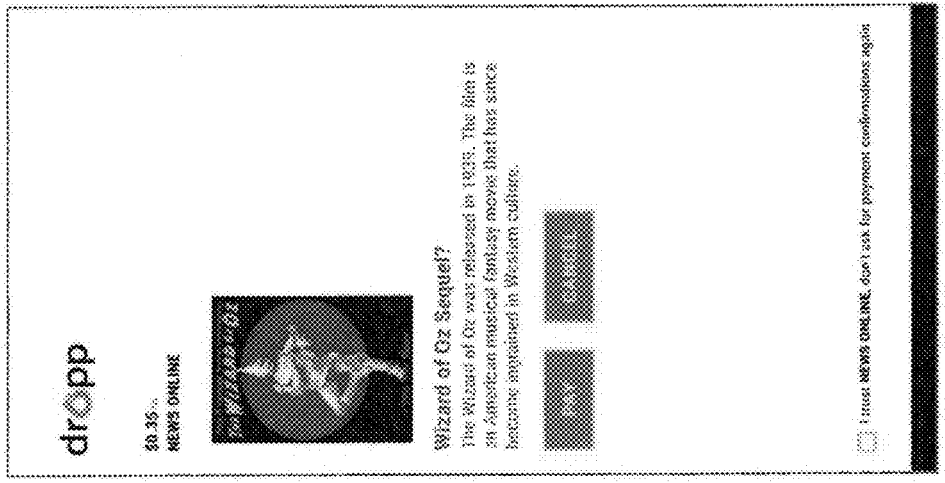
FIG. 7 is an example screenshot of a user approval needed for a payment.

Referring to FIG. 6, clicking of the link launches the wallet application residing on the consumer-participant 10. Referring to FIG. 7, the wallet application will then display the item and the amount in fiat currency for approval. If the consumer is paying in cryptocurrency, the quantity of cryptocurrency that will be paid is calculated using the micropayment's system current currency exchange rate to the invoice currency. The exchange rate used will be recorded in the DPP.

Upon receiving approval of the purchase (for example, clicking of a PAY button as shown in FIG. 7), the wallet residing on the consumer-participant 10 creates a DPP (S3), which will have the consumer's distributed ledger account information, the merchant-participant's DMI, payment distribution instructions for payment as specified in the DMI, and the consumer's distributed ledger private key, which serves as the digital affirmation (i.e. digital signature).

The DPP is then sent from the wallet application residing on the consumer-participant 10 to the merchant-participant 12 (S4).

The merchant-participant 12 validates the item, the cost, and the payment distribution in the DPP received from the consumer-participant 10 (S5).

Once the DPP is validated (i.e. is judged to be correct) the merchant-participant 12 digitally signs the DPP with the merchant-participant's private key and sends it to the micropayment system 14 (S6).

The micropayment system 14 then validates the consumer-participant's digital signature, validates the merchant-participant's digital signature, and the contents of the DPP including payment amount and the distribution instructions (S7).

The micropayment system 14 then checks to determine whether the consumer-participant's fiat currency balance in the consumer's distributed ledger 16 account 34 is sufficient to cover the purchase amount in the DPP (S8).

Figure 8:
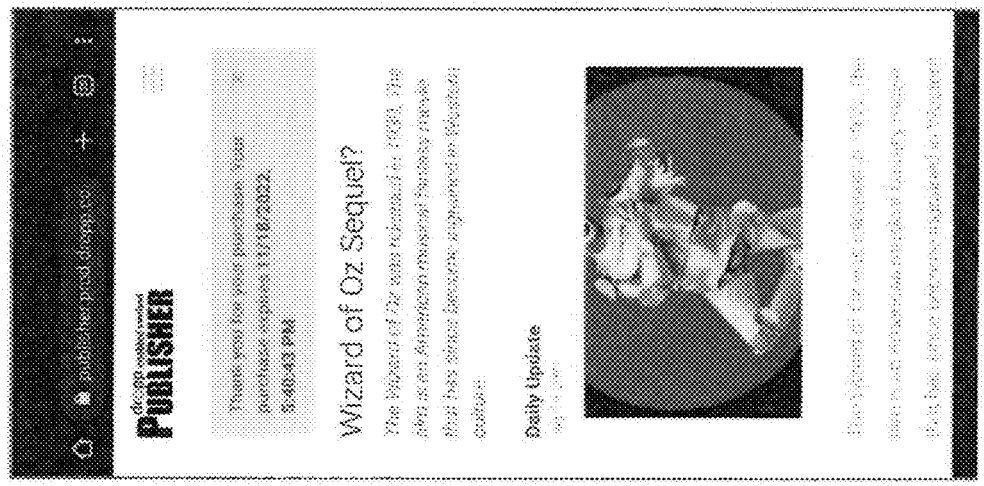
FIG. 8 is an example screenshot of a merchant providing access to a product.

The micropayment system 14 then sends a message to the merchant-participant 12 system indicating whether the DPP is valid and authentic, and whether the consumer-participant has the necessary funds to cover the payment amount (S9). Referring to FIG. 8, the merchant-participant provides the purchased item(s) to the consumer.

If the consumer-participant's account has enough funds to cover the payment amount in the DPP, the micropayment system 14 creates a distributed ledger transaction file containing the DPP that is signed by the merchant-participant 14, and submits the distributed ledger transaction file to the distributed ledger 16 (S10), or a plurality of distributed ledgers for recording.

The micropayment system then debits the consumer-participant's fiat currency account in the distributed ledger 16 and credits the merchant-participant's fiat currency account in the distributed ledger 16.

Figure 2:
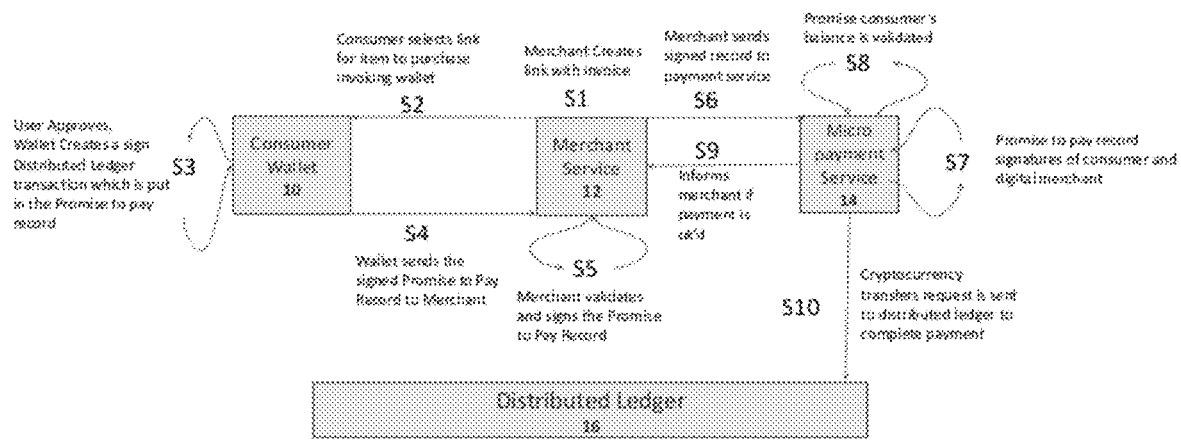
FIG. 2 illustrates a micropayment transaction using a micropayment platform with a cryptocurrency as payment.

Referring to FIG. 2, in response to a request from a consumer-participant 10 for good(s) or service(s) ("item") offered for sale by the merchant-participant 12, the merchant-participant 12 creates a DMI (S1). The DMI may include the description of the item, the cost of the item in fiat currency, and payment distribution instructions. The merchant-participant 12 then sends the DMI (in a text message or an email) to the consumer-participant 10 along with a clickable link. As an alternative, a QR code, which contains the DMI, may be generated by the merchant-participant and scanned by the consumer-participant 10.

The clicking of the link launches the wallet application residing on the consumer-participant 10. The wallet application then obtains the cryptocurrency exchange rate, and presents the amount for the purchase of the item in cryptocurrency for approval.

Upon receiving the approval (for example, receiving an indication of the clicking of a PAY button), the wallet creates a distributed ledger transaction file to effect the transfer of cryptocurrency from the consumer's account (account associated with the consumer-participant 34) to the merchant's account (account associated with the merchant participant 36). The distributed ledger transaction file is signed by the wallet application residing on the consumer-participant using the consumer's private key and added to the DPP (S3).

The DPP is sent from the consumer-participant 10 to the merchant-participant 12 (S4).

The merchant-participant 12 validates the payment, signs the DPP with the merchant-participant's private key (S5) and sends the signed DPP to the micropayment system 14 (S6) for validation.

The micropayment system 14 validates the signatures and contents of the signed DPP, which include the consumer's digital signature on the distributed ledger transaction file, contents of the DMI, the merchant's digital signature, and the cryptocurrency payment instructions (S7). The micropayment system 14 also confirms that the consumer's cryptocurrency balance is enough to cover the payment (S7).

The micropayment system 14 then sends a message to the merchant-participant 12 indicating whether the DPP is valid and authentic, whether the distributed ledger transaction details are correct, and whether the consumer-participant has the necessary funds to cover the payment amount (S8).

The micropayment system 14 then posts the distributed ledger transaction on the distributed ledger 16 to transfer the cryptocurrency to the merchant's account and the accounts of any other participant specified by the DMI.

The distributed ledger 16 then immediately transfers the payment from the consumer's account to the accounts designated to receive payment.

Figure 3:
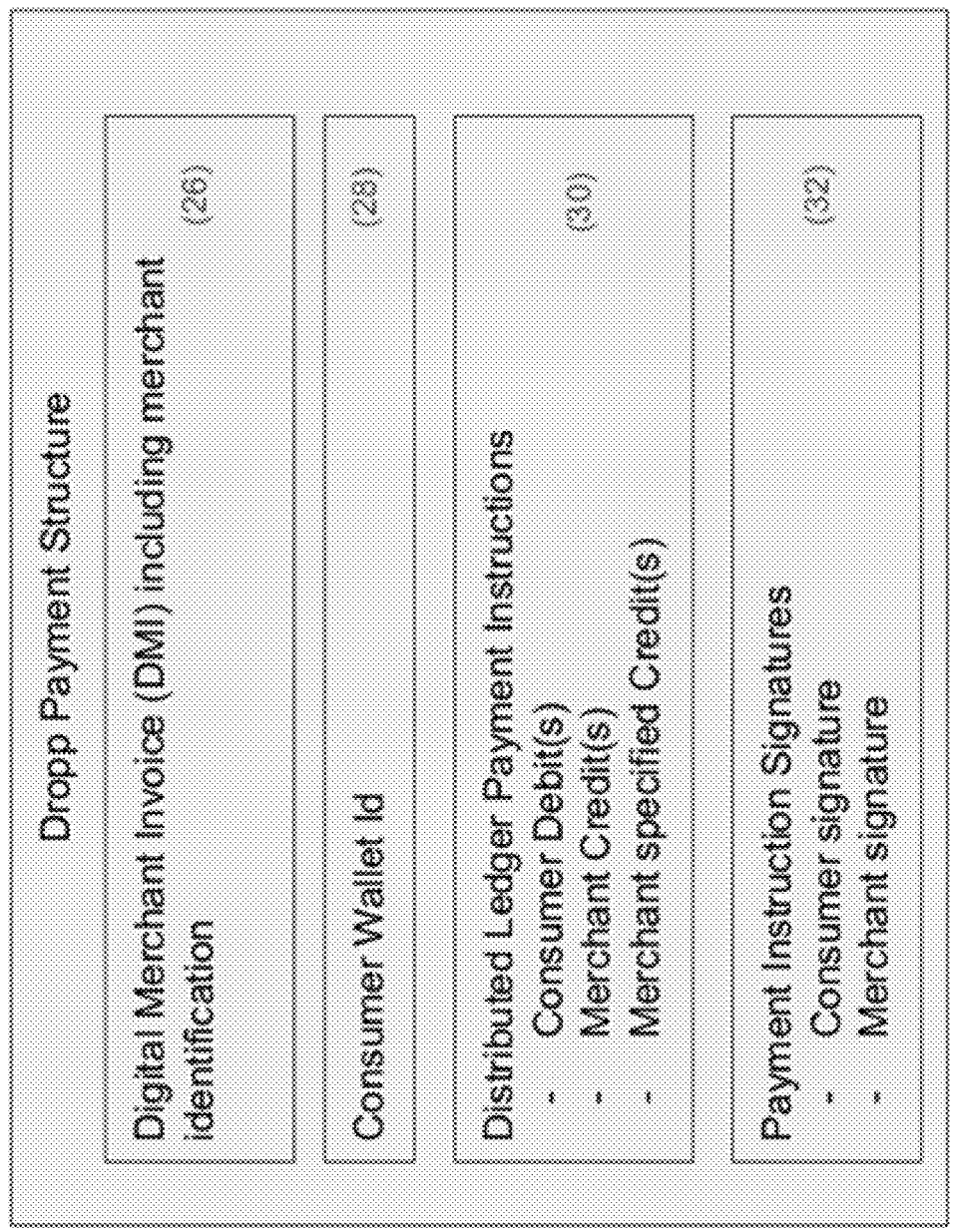
FIG. 3 illustrates the data structure of the Digital Promise to Pay (DPP) document.

FIG. 3 shows the contents of a DPP according to the present invention, which includes the Digital Merchant Invoice (DMI) 26, the Consumer Wallet 28, the Distributed Ledger Payment Instructions 30, and Payment Instruction Signatures 32.

The DMI 26 includes the merchant identification information and the description of goods or services being purchased by the consumer.

The Consumer Wallet 28 has the consumer's identification information.

The Distributed Ledger Payment Instructions 30 will have instructions for payment from the consumer's account to the merchant and merchant specified account. Payment instructions for fiat payments are recorded on the distributed ledger. Payment instructions for cryptocurrency payments are the instructions for the distributed ledgers to make the transfers from the consumer's cryptocurrency account to the merchant and merchant specified cryptocurrency accounts.

The Payment Instruction Signatures 32 include signatures from the consumer and merchant signing off on the payment instructions.

Payment Instruction Illustration

Figure 4:
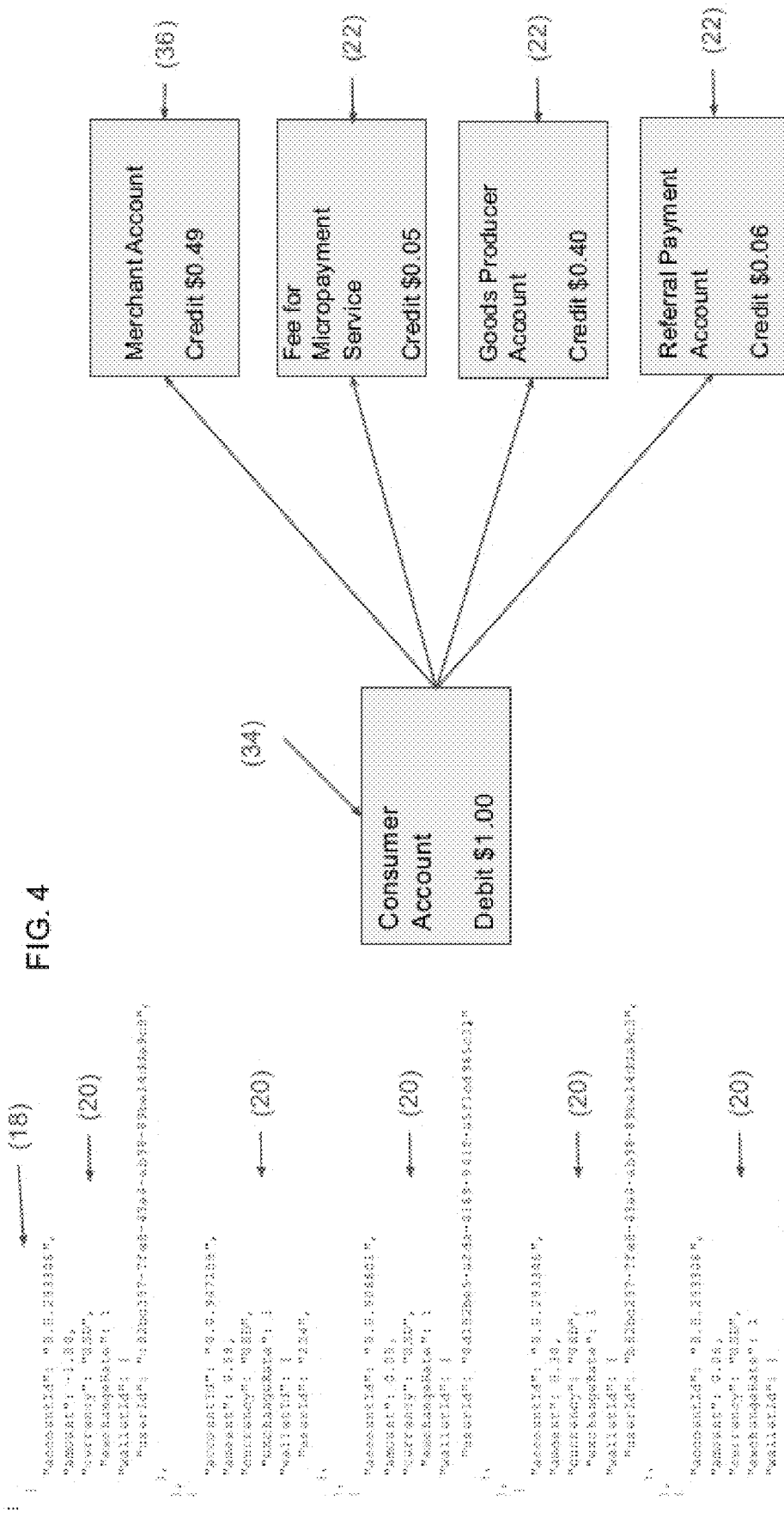
FIG. 4 illustrates the simultaneous payment instruction.

Referring to FIG. 4, the payment instructions 18 will have a debit from the consumer's account, and credits to the merchant and micropayment service provider.

Each segment 20 of the payment instruction 18 contains the currency, the amount, the distributed ledger account identifiers, the wallet identifier, and the exchange rate to convert between the invoice currency and the payment currency.

The payment instructions from the merchant may split the payment amount due with related parties 22 such as parties involved with the creation or the delivery of the good.

The payment instructions from the merchant may split the payment amount due as incentive payments to referrers or other parties with a sales incentive.

Figure 5B:
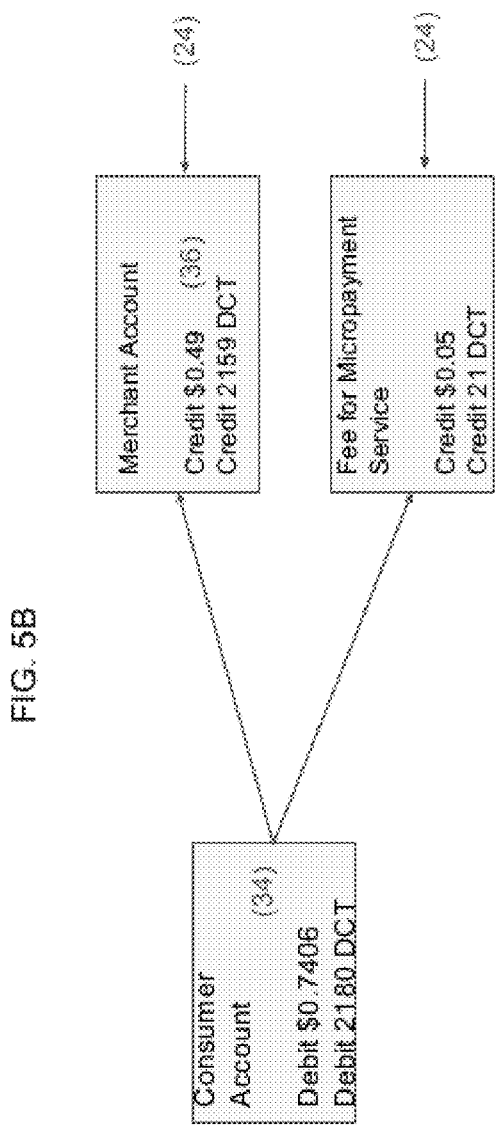

Referring to FIG. 5B, the payments 24 may include multiple currencies permitting the consumer to pay for a merchant invoice with more than one currency.

The sum of the payment in each currency must match the merchant invoice.

If the denomination of the currency used in a payment is different than the invoice currency, an exchange rate is used to convert to the invoice currency.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of effecting a transaction with a micropayment platform that includes a merchant-participant comprising at least one merchant-participant computer, a consumer-participant comprising at least one consumer-participant computer configured to communicate with the merchant-participant computer via a communication network, a micropayment system comprising at least one computer configured to communicate with the merchant-participant computer via the communication network, and a distributed ledger comprising at least one computer configured to communicate with the micropayment system via the communication network, the merchant-participant computer being configured to generate a digital merchant invoice (DMI) in response to a request received from the consumer-participant computer to purchase goods and services and is configured to send the requested DMI to the consumer-participant computer, the consumer-participant computer is configured to generate a digital promise to pay (DPP) based on the received DMI, to add a digital signature of the consumer-participant generated with a private key of the consumer-participant to the DMI, and to send the generated DPP digitally signed by the consumer-participant's digital signature to the merchant-participant computer, and the merchant-participant computer is configured to validate the DPP received from the consumer-participant computer, and add a digital signature of the merchant-participant to the validated DPP, the digital signature of the merchant-participant being generated with at least a private key of the merchant-participant, the method comprising:

receiving by the micropayment system from the merchant-participant computer the DPP that is validated and bearing the digital signature of the merchant-participant, and the digital signature of the consumer-participant (VSDPP);

validating the VSDPP by the micropayment system using at least a public key of the consumer-participant, the VSDPP including information from the DMI from the merchant-participant, the digital signature of the merchant-participant, the digital signature of the consumer-participant, and payment instructions that include an instruction to transfer an amount from an account associated with the consumer-participant to at least an account associated with the merchant-participant, and an instruction to transfer another amount from the account associated with the consumer-participant to at least an account associated with at least one non-participating third party; and sending a message to the merchant-participant computer indicating that the amount payable to the merchant-participant is available by checking an account associated with the consumer-participant; and effecting payment according to payment instructions.

2. The method of claim 1, the method further comprising debiting from the account associated with the consumer-participant an amount corresponding to the amount payable to the at least one non-participating third party; and crediting an account of the non-participating third party; with an amount corresponding to the amount payable to the non-participating third party based on the merchant-participant's instructions in the VSDPP.

3. The method of claim 1, wherein the amount payable to the merchant-participant is in a fiat currency.

4. The method of claim 1, wherein the amount payable to the merchant-participant is in a cryptocurrency.

5. The method of claim 1, wherein the consumer-participant's private key is associated with the public key of the consumer participant, and wherein the private key is associated with the account that is associated with the consumer-participant, and further comprising using the public key in the checking of the account associated with the consumer-participant.

6. The method of claim 1, wherein the merchant-participant's digital signature is a private key stored at the merchant-participant.

7. The method claim 1, wherein the merchant-participant is a website configured for e-commerce or a physical device capable of displaying a QR code generated by the merchant.

8. The method of claim 1, wherein the consumer-participant computer has a digital wallet residing thereon that is configured to generate the DPP from the DMI by digitally signing the DPP with a digital signature.

9. The method of claim 8, wherein the consumer-participant's digital signature is a private key associated with the account associated with the consumer-participant.

10. The method of claim 8, wherein the consumer-participant's computer is a smart phone, a tablet, or a PC.

11. The method of claim 1, wherein the micropayment system is configured to create an account in the distributed ledger along with a private key for the account and a public key, and further comprising, prior to the receiving by the micropayment system from the merchant-participant the VSDPP, creating, by the micropayment system, an account in the distributed ledger for the consumer-participant along with an associated private key and an associated public key for the created account, wherein the created account is the account associated with the consumer-participant that is checked by micropayment system.

12. The method of claim 11, further comprising crediting, with the micropayment system, the account associated with the consumer-participant with a fiat currency or a cryptocurrency according to instruction received from the consumer-participant computer.

13. The method of claim 1, wherein payment instructions include an instruction to make payment with a fiat currency in the account associate with the consumer-participant, the method further comprising, submitting a record to the distributed ledger indicating payment from the account associated with the consumer-participant to the account associated with the merchant-participant;

debiting from the account associated with the consumer-participant an amount corresponding to the amount payable to the merchant-participant in fiat currency; and crediting the account associated with the merchant-participant the amount payable to the merchant-participant in fiat currency.

14. The method of claim 1, wherein payment instructions include an instruction to make payment with a cryptocurrency in the account associated with the consumer-participant, the method further comprising, submitting the signed payment instructions to the distributed ledger to perform the transfer from the account associated with the consumer-participant to the account associated with the merchant-participant.

15. The method of claim 1, wherein the DPP signed by the consumer-participant does not include personal information of the consumer-participant.

* * * * *